July 27, 1943.　　　　F. W. BROOKE　　　　2,325,303
SELF-LOCKING NUT
Filed July 29, 1942　　　　2 Sheets-Sheet 1
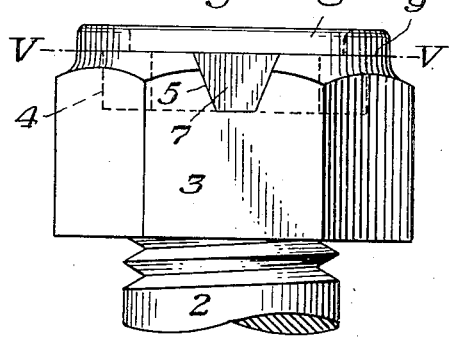
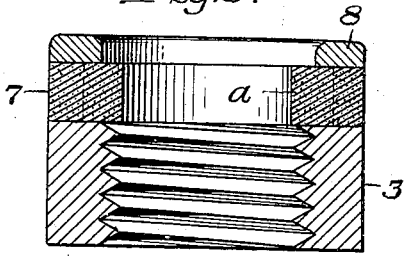
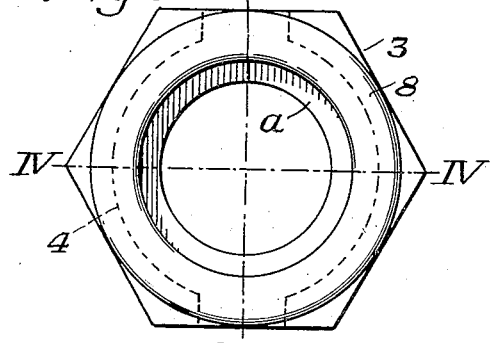
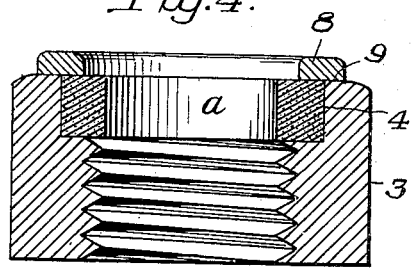
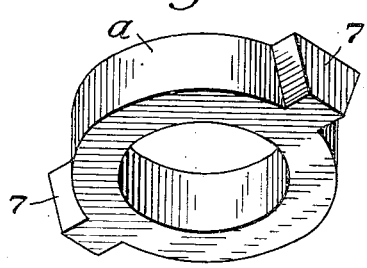
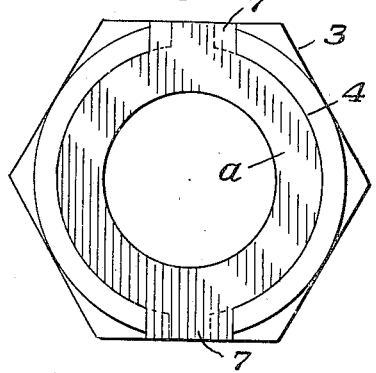
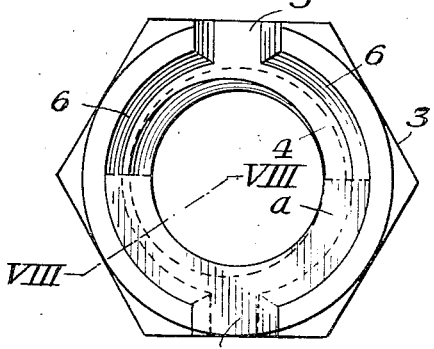
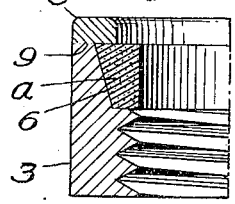
INVENTOR
Frank W. Brooke
by C. M. Clarke
Attorney July 27, 1943.    F. W. BROOKE    2,325,303
SELF-LOCKING NUT
Filed July 29, 1942    2 Sheets-Sheet 2

INVENTOR
Frank W. Brooke
by C. M. Clarke
Attorney

Patented July 27, 1943

2,325,303

UNITED STATES PATENT OFFICE 2,325,303

SELF-LOCKING NUT

Frank W. Brooke, Pittsburgh, Pa.

Application July 29, 1942, Serial No. 452,694

16 Claims. (Cl. 151—7)

This invention is an improvement in the art of self-locking nuts wherein holding engagement with the threads of the bolt is effected by means of a compressible somewhat resilient body or insert unit of suitable material incorporated with the nut, for thread engagement, as applied to the bolt.

It involves the use of a cushioning thread-engaging insert, immovably held within the interior body of the nut, having a middle bore opening of suitable contour for effective thread formation, during application.

Also a welded-on retaining and finishing cap or ring, of such construction and application as to completely confine the insert, and to provide for terminal finish, without materially lengthening the nut or impairing its general surface finish.

The invention also has in view the employment of an improved method of manufacture of the nut by operations tending to complete investment of the insert or unit within the nut body, without unfilled vacancies.

Also, by rapid welding attachment of a terminal closure member, effecting complete simultaneous distribution of the insert portions exteriorly, with proper firm positioning of the thread-engaging bore.

The invention also provides for and presents a solution of various problems arising in connection with the formation of the inner face of the insert bore, with relation to opposing forces of bolt threads of different metals, pitch, size, etc.

The subject matter of this application is an improvement upon or a development of that general type of self locking nuts, such as is disclosed in my prior Patents No. 2,286,336 and 2,286,667.

Certain preferred types of the invention are illustrated in the accompanying drawings, in which:

Fig. 1 is a view showing the improved nut as applied to the threaded end of a bolt;

Fig. 2 is a plan view of same;

Fig. 3 is a vertical sectional view on the line III—III of Fig. 2;

Fig. 4 is a similar view on the line IV—IV of Fig. 2;

Fig. 5 is a plan view of the nut with the insert in position and the confining member removed, on the line V—V of Fig. 1;

Fig. 6 is an isometric view of the insert or unit, detached;

Fig. 7 is a plan view of the nut showing a tapered insert as applied at one side of the center, the other side showing the receptive cavity therefor;

Fig. 8 is a vertical section on the line VIII—VIII of Fig. 7, showing a modified cross section of the insert adapted to be engaged by such form of nut;

Figure 9:
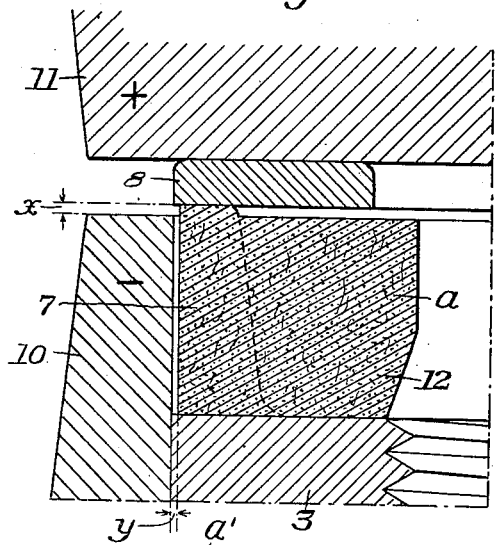
Fig. 9 is an enlarged sectional view illustrating the operation of compression by and electric welding of the confining member.

Referring to the drawings, the bolt 2 and nut 3 may be of any usual standard or modified construction exteriorly, for wrench or other applied force, in application.

Either or both may be of any suitable or preferred metal, or of desired dimensions as to length, diameter, gauge of threads, or shape of nut, i. e., square, hexagonal, octagonal, etc., as desired.

Entirely within the body of the nut is the continuously annular thread-engaging insert or unit a. Such unit is of a composition sufficiently plastic or mobile and preferably somewhat resilient under pressure for deformation, as acted upon by the terminal threads of the bolt as the nut is applied. Also by compression and compensating movement to become closely engaged by and with the bolt threads, partly or throughout the depth of the unit.

While any suitable substance or material may be utilized for such insert, as fibre, fibrous composition, comminuted cork, etc., I have found a composition including asbestos fibre or other heat resisting material and a binder to be useful and successful.

For reception of the insert within the main body of the nut I provide an annular interior cavity 4 extending by one or more radial channels or openings 5 to or towards the exterior side face or faces of the nut.

The annular cavity 4, which provides a receiving and holding seat for the insert, has a supporting bottom extending laterally beyond the nut thread and an outer vertical wall as in Fig. 4, or which may be inwardly inclined or converging as at 6, Figs. 7 and 8.

The insert or unit a may be preformed, as in Fig. 6, or may be initially forced inwardly to position when sufficiently soft, by sufficient pressure, while or when somewhat plastic, and with or by properly designed confining, applying, and bore forming means, as a mandrel, such as disclosed in my said Patent 2,286,336.

With either manner of making, the insert is designed to have a middle bore opening having a diameter partly or entirely approximating the small diameter of the threads of a cooperating bolt.

It is provided initially or during placement with one or more radially disposed lugs 7, having either straight or tapered sides, or of other formation, adapted for reception and holding engagement with one or more of the lateral openings or channels 5, of whatever form.

By such or other suitable means, the insert $a$ when in position, will resist any tendency to turn, upon engaging the bolt, and externally the lug or lugs should not extend beyond the outer nut surface.

In such position, the insert is further retained in position by a covering member, as ring 8, welded around its outer under surface as at 9, to the nut, and overlapping the outer edge portions of the insert.

Such formation of the insert, prior to insertion, is readily available, by present well developed modern practical methods and apparatus for molding plastic materials of predetermined shape and form, under pressure. Such practice, especially under application of heat in said well developed art, is entirely successful in the forming and conversion of a potentially reactive plastic mass into a substantially set and more or less hardened form.

I show in Figs. 9 to 14 inclusive various modifications of the invention, relating to its manufacture under pressure and heat for applying and connecting the terminal ring 8. Also by such means, coincidental further re-distribution of the lug portion of the unit for final distribution and shaping.

In such operation, the nut with its insert and the ring 8 about to be secured, are placed between a supporting base 10 and the pressure head 11 of a spot welding machine of opposite polarity.

For such operation, the lug or lugs 7 of the insert extend slightly above its main upper surface, as at $a'$, the extent of such extension being indicated at $x$.

Likewise, the lateral extension of the lug may be slightly less than its ultimate limit when pressed against the side of base 10, as indicated at $y$.

Under pressure of head 11 and simultaneous current-generated heating action, the lug portion of the insert will be compressed to its common upper level, and also forced outwardly, thereby finally extending and finishing both the upper and end portions of the lug. At the same time the ring 8 is permanently welded around the rim of the nut, on the line V—V of Fig. 1, as above described.

A further important feature of consideration is in connection with the problem of controlling or regulating resistance between the entering threads of the bolt and the disturbed and resisting inner annular face of the bore of insert $a$, within safe limits and as a factor of safety, and for best results in use.

Obviously, dependent on the particular metal of the bolt and its threads, and the resisting value or measure of the insert, of whatever substance, a proper balance of power should be preserved.

I have solved this problem, dependent on existing conditions, by suitably varying the contour of the bore where necessary, to prevent or minimize excessive undesired resistance or destructive strains, in either the bolt or the insert.

Thus, while ordinarily a straight bore surface may be utilized, as in the principal figures of the drawings, and will be generally satisfactory, any such abnormal resistance and resulting strains may be overcome by variably tapering the bore at and beyond its thread-engaging end.

Thus as in Fig. 9, such taper may extend, as at 12, from for instance its largest diameter, approximating that of the bolt, to an intermediate point, the bore beyond approximating the small diameter of the bolt.

Figure 11:
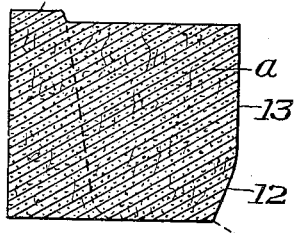
Figs. 11 and 12 are partial views, similar to Fig. 9, but showing a modified form of the thread-engaging face of the bore.

A further modification is shown in Fig. 11 where the taper 12 merges into a straight receded inner face 13, somewhat less in diameter than that of the root of the bolt thread, providing more or less clearance throughout.

Figure 12:
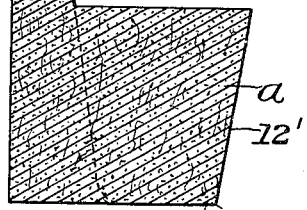

In Fig. 12 the taper 12' extends from the inner edge of the insert bore to the outer edge, with each approximating the outer and inner tooth crown and root diameters respectively.

With either such arrangement the insert $a$ may be thus modified, more or less as desired, depending on conditions, as suggested.

Figure 10:
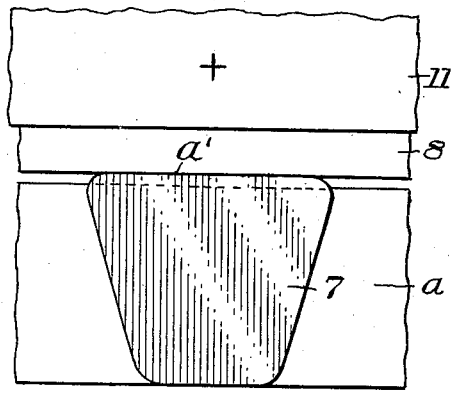
Fig. 10 is a front face view thereof.

Also, the insert may be creased or grooved, as shown in Figs. 10 and 11 of my prior Patent 2,286,667, above noted.

Figure 13:
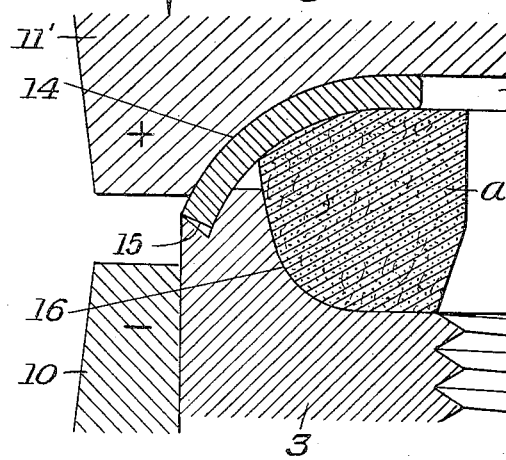
Fig. 13 is a sectional detail view, like Fig. 9, showing a modified construction of the confining member.
Figure 14:
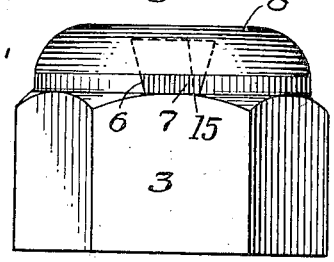
Fig. 14 is a view of the complete nut according to such construction.

Figs. 13 and 14 illustrate a further modification, in which the cap 8' is provided with a rounded or coniform perimeter 14 adapted to conform to the upper outer conformably shaped portion of the insert, and to make more or less flush continuity with a shouldered edge of the nut, as at 15.

Such joint should be designed so as to make contact in conformity with best approved practice in the welding art, and with heat generation promoting distribution of the insert, under pressure. Likewise the outer under seating of the unit in the nut recess may be rounded if desired, as at 16.

Such construction, especially as to the cap 8', provides for application of pressure by the conforming welding head 11', to exert an angular component to the plastic unit, while also improving the appearance and finish of the entire nut.

The construction and method of manufacture of my improved self-locking nut will be readily understood and appreciated, from the foregoing description.

It is simple, efficient, and easily made and used; economical to manufacture, and requires but a minimum of extra metal, easily utilized from commercial bar stock. It avoids the expense and other objections present in different commercial constructions; is especially available in connection with hot press operations; eliminates objectionable irregularities in making and the resulting product; and is generally available as a practicable self-locking nut in a wide variety of applications, or when the body of the nut is made of heat treated steel.

My improved nut may be made in a varied range of sizes, standard or otherwise; is continuously and uniformly useful; and may be changed or modified in construction, within the scope of the following claims.

I claim:

1. A nut provided with an annular terminal recess and radial enlargement thereof extending inwardly towards the threads, a locking insert therein having a radial extension in rotation preventing engagement with said enlargement, and a retaining ring for the insert welded to the nut.

2. A nut provided with an annular terminal recess extending inwardly towards the threads and laterally beyond them providing a seat and a radial opening, a locking insert in said recess having a radial holding lug engaging said opening, and an outer retaining ring engaging the insert and welded to the nut.

3. A nut provided with an annular terminal recess extending inwardly to a plane defining the thread terminal and extending laterally beyond same to provide a seat and a radial opening, a locking insert in said recess having a radial holding lug engaging said opening, and an outer retaining ring engaging the insert and welded to the nut.

4. A nut provided with an annular terminal recess extending inwardly towards the threads and provided with a radial socket, a locking insert therein provided with a localized retaining lug engaging the socket portion of said recess, and a retaining ring for the insert welded to the nut.

5. A nut provided with an annular terminal recess extending inwardly towards the threads, a locking insert therein provided with a localized retaining lug engaging a socket portion of said recess and extending outwardly from the insert, and a retaining ring therefor applied under pressure and welding heat effecting localized distribution of the insert.

6. A nut provided with an annular terminal recess extending inwardly to a plane defining the thread terminal and extending laterally beyond same to provide a circular seat having radial holding openings, a locking insert in said recess having radial holding lugs engaging said openings, and a retaining ring therefor welded to the nut.

7. A nut provided with an annular terminal recess extending inwardly to a plane defining the thread terminal and extending laterally beyond same to provide a circular seat having radial holding openings, a locking insert in said recess having radial holding lugs engaging said openings and extending beyond the outer plane of the insert, and a retaining ring therefor applied under pressure and welding heat effecting localized distribution of portions of the insert.

8. In the manufacture of self locking nuts, the method consisting in forming an interior annular cavity and a radial socket between the outer end of the nut and its threads, filling said cavity with a deformable insert having a laterally extending holding portion extending beyond the outer periphery and plane of the insert and into said socket, and then applying a retaining ring to the insert and outer face of the nut under pressure and welding heat while effecting localized distribution of said holding portion into said socket and in conformity with the outer plane of the insert.

9. A thread engaging insert for self locking nuts having a central bore of a diameter less than that of the outer thread diameter of the nut, and a holding lug extending laterally from the outer periphery of the insert, and adapted for engagement within a complementary opening leading radially from a central recess of the nut.

10. A thread engaging insert for self locking nuts having a central bore of a diameter less than that of the outer thread diameter of the nut, and a holding lug extending beyond the outer surface plane and from the outer periphery of the insert, and adapted for engagement within a complementary opening leading radially from a central recess of the nut.

11. A nut provided with an annular terminal recess extending inwardly to the nut thread, a locking insert therein having an outer rounded periphery and a radial lug engaging a complementary opening leading radially from a central recess of the nut, and a retaining ring therefor having a conforming rounded periphery welded to the nut.

12. A nut provided with an annular terminal recess extending inwardly to the nut threads, a locking insert therein having an outer rounded periphery and a radial lug engaging a complementary opening leading radially from a central recess of the nut, and a retaining ring therefor having a conforming rounded periphery in flush shouldered engagement with the nut and welded thereto.

13. A nut provided with an annular terminal recess extending inwardly to the nut threads and having an outer rounded seat, a locking insert therein having an inner conforming rounded surface engaging said seat and an outer rounded periphery and a radial lug engaging a complementary opening leading radially from a central recess of the nut, and a retaining ring therefor having a conforming rounded periphery in shouldered engagement with and welded to the nut.

14. A nut provided with an annular terminal recess extending inwardly to the nut threads and having an outer rounded seat, a locking insert therein having an inner conforming rounded surface engaging said seat and an outer rounded periphery and a radial lug engaging a complementary opening leading radially from a central recess of the nut, and a retaining ring therefor having a conforming rounded periphery in compressing engagement and heat imparting contact relation with the insert and having shouldered engagement and flush welded connection with the nut.

15. In the manufacture of self locking nuts, the method consisting in forming an interior annular cavity and a radial socket between the outer end of the nut and its threads, filling said cavity with a deformable insert having a laterally extending holding portion engaging a complementary socket in the nut and an outer rounded peripheral portion, and then applying a retaining ring having an outer rounded portion conforming to the rounded contour of the insert and in edge contact with the nut under pressure and welding heat while subjecting the insert to softening temperature and distribution of portions thereof into any unfilled space between the ring and the nut, and effecting simultaneous welded connection between the outer edge of the ring and the nut.

16. A thread engaging insert for self locking nuts having a central bore, the outer portion of which is of a diameter approximating that of the inner thread diameter of the nut and the inner portion of which is tapered and gradually enlarged inwardly beyond that of the inner thread diameter of the nut, and having a holding lug extending laterally from its outer periphery adapted for holding engagement with a radial socket in the nut.

FRANK W. BROOKE.